Figure 1:
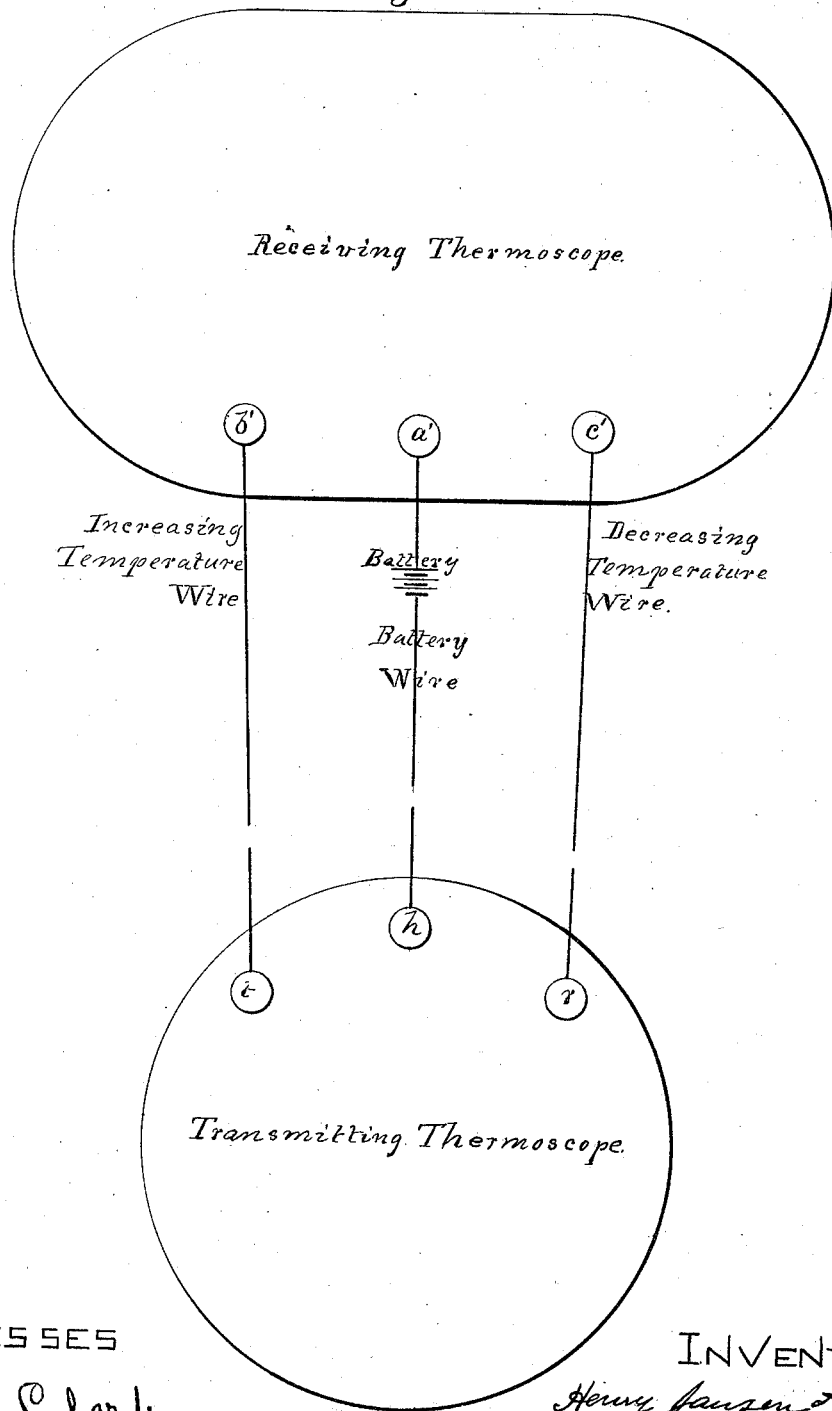

(No Model.) 11 Sheets—Sheet 2.
H. J. HAIGHT.
ELECTRO MAGNETIC THERMOSCOPE.
No. 307,543. Patented Nov. 4, 1884.

WITNESSES
N. A. Clark.
A. S. Brown.

INVENTOR
Henry Jansen Haight,
By his attorney,
J. S. Brown.

(No Model.)

H. J. HAIGHT.

ELECTRO MAGNETIC THERMOSCOPE.

No. 307,543. Patented Nov. 4, 1884.

11 Sheets—Sheet 3.

(No Model.)  11 Sheets—Sheet 4.
H. J. HAIGHT.
ELECTRO MAGNETIC THERMOSCOPE.
No. 307,543.  Patented Nov. 4, 1884.
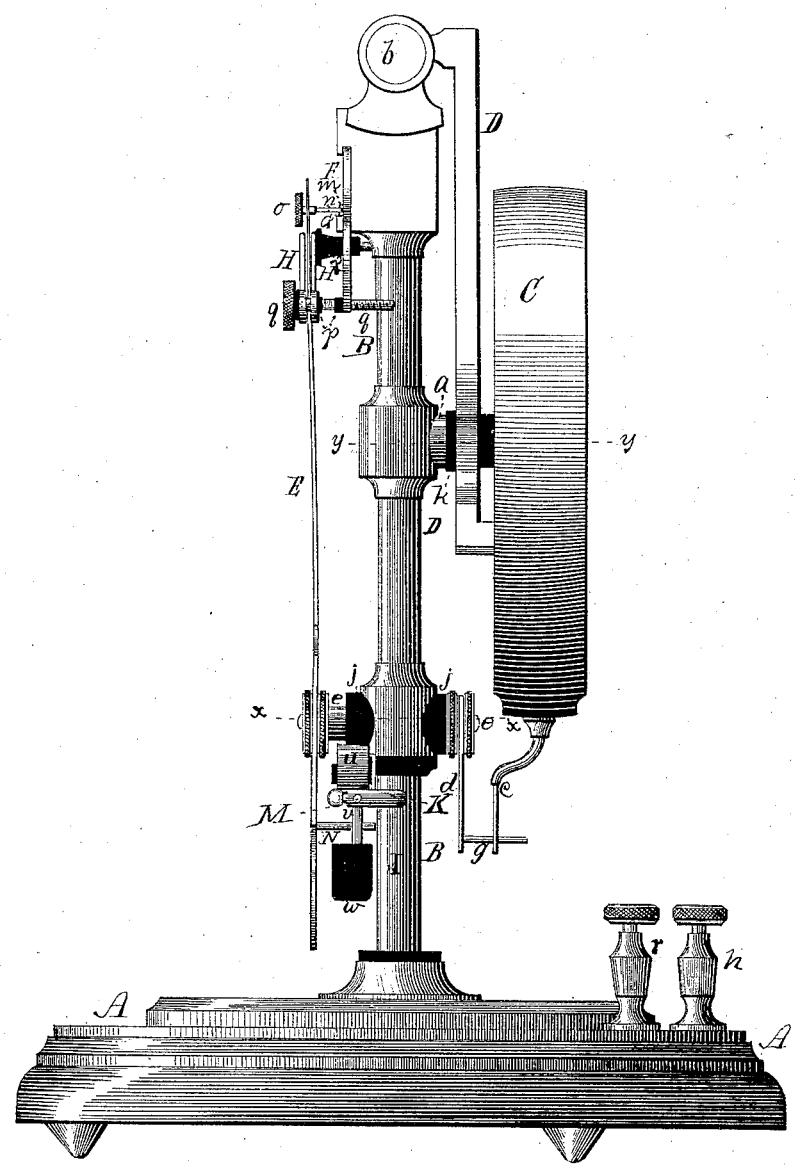

(No Model.)  11 Sheets—Sheet 5.
H. J. HAIGHT.
ELECTRO MAGNETIC THERMOSCOPE.
No. 307,543.  Patented Nov. 4, 1884.
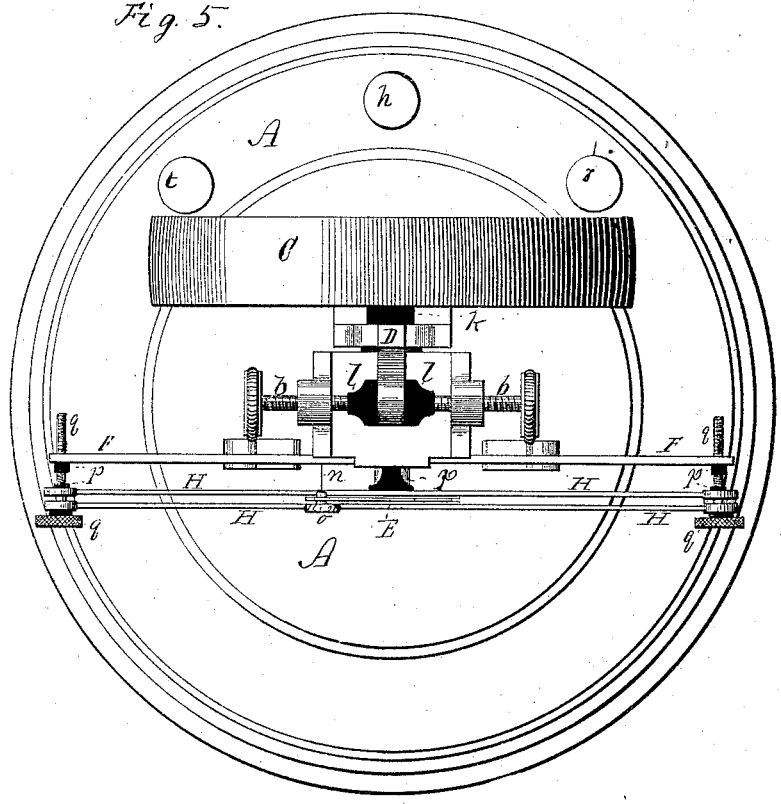
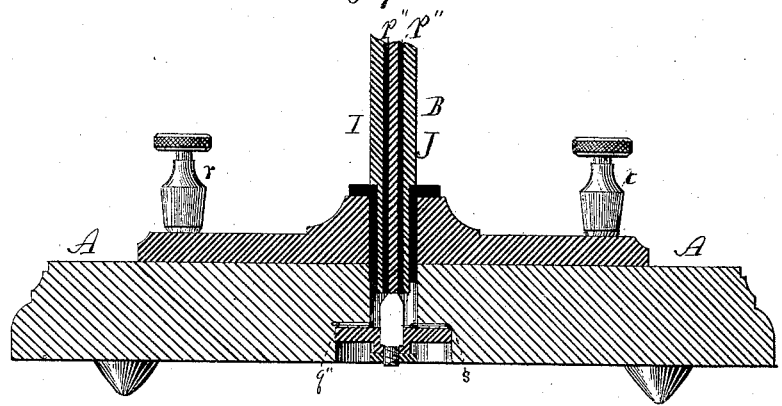
WITNESSES
N. A. Clark
A. S. Brown
INVENTOR
Henry Jansen Haight,
By his attorney,
J. S. Brown (No Model.) 11 Sheets—Sheet 6.
H. J. HAIGHT.
ELECTRO MAGNETIC THERMOSCOPE.
No. 307,543. Patented Nov. 4, 1884.
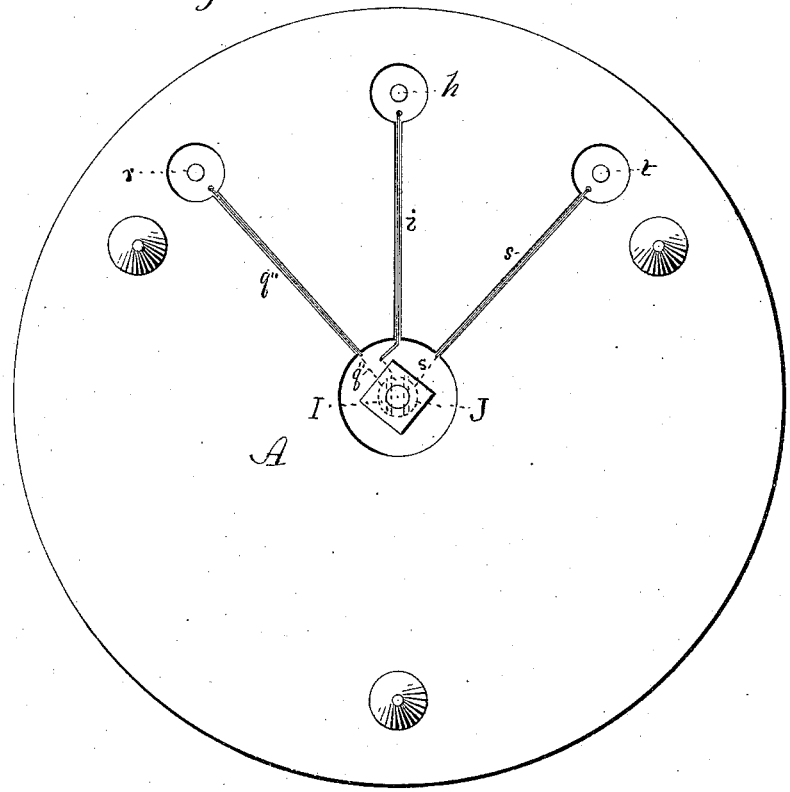
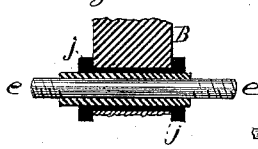
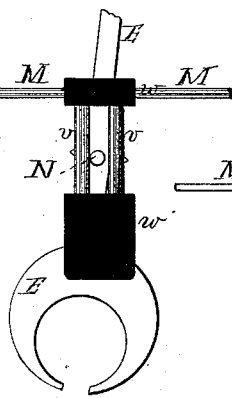
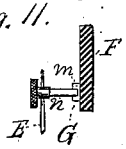
Witnesses
N. A. Clark.
A. S. Brown.
Inventor
Henry Jansen Haight,
By his attorney,
J. S. Brown.

(No Model.)  11 Sheets—Sheet 7.
H. J. HAIGHT.
ELECTRO MAGNETIC THERMOSCOPE.
No. 307,543.  Patented Nov. 4, 1884.
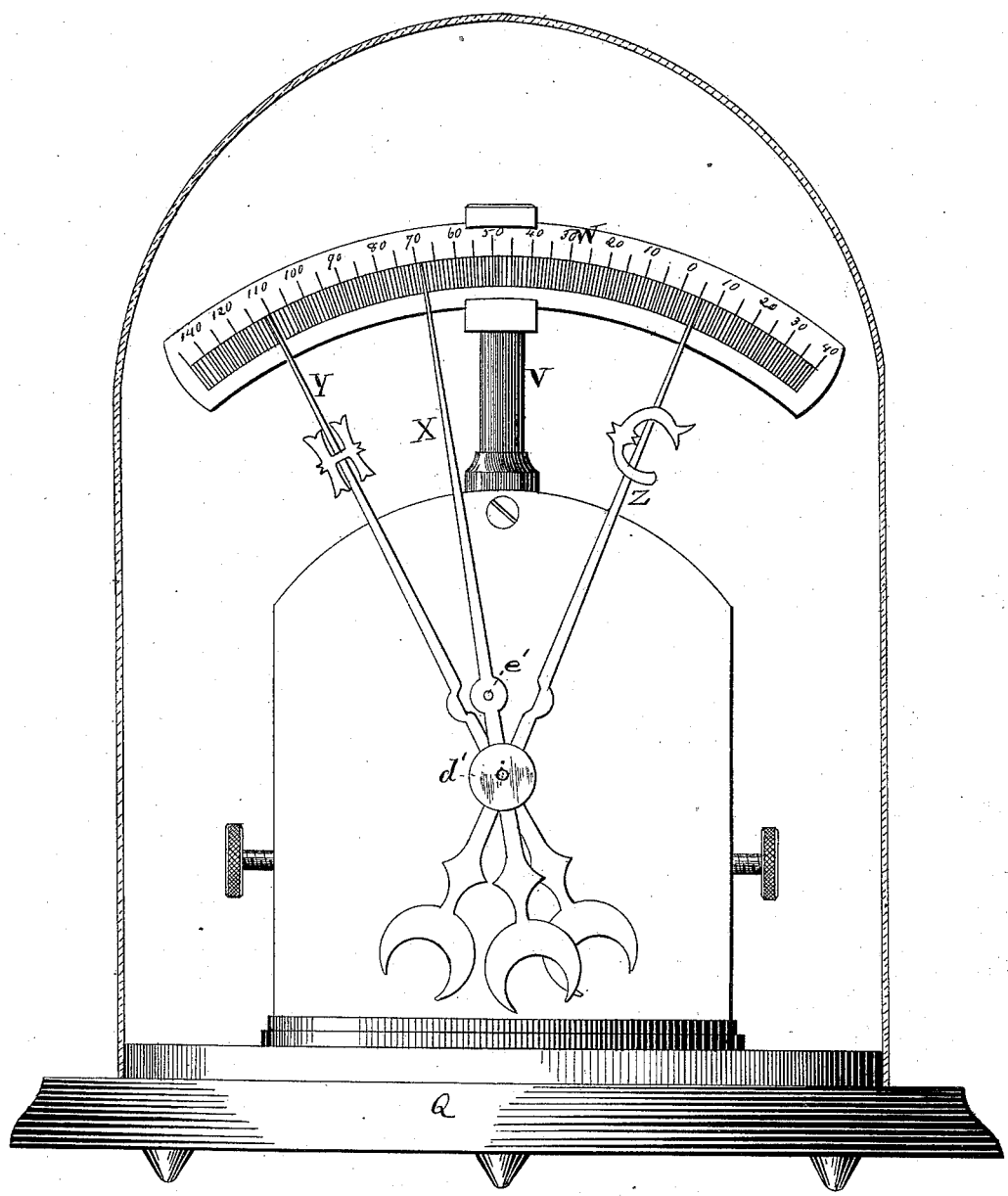

(No Model.)　　　　　　　　　　　　　　　　　11 Sheets—Sheet 8.
H. J. HAIGHT.
ELECTRO MAGNETIC THERMOSCOPE.
No. 307,543.　　　　　　　　Patented Nov. 4, 1884.
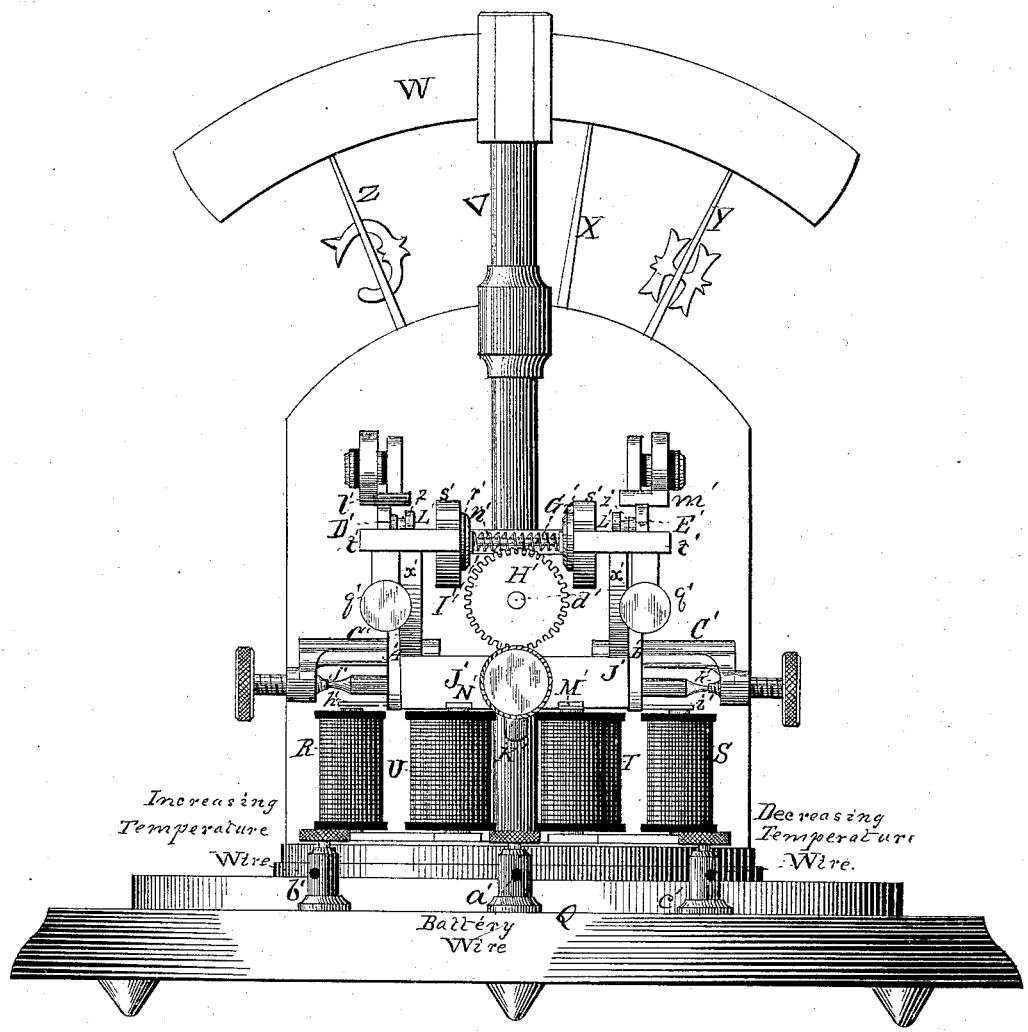
WITNESSES
N. A. Clark.
A. S. Brown
INVENTOR
Henry Jansen Haight,
By his attorney,
J. S. Brown.

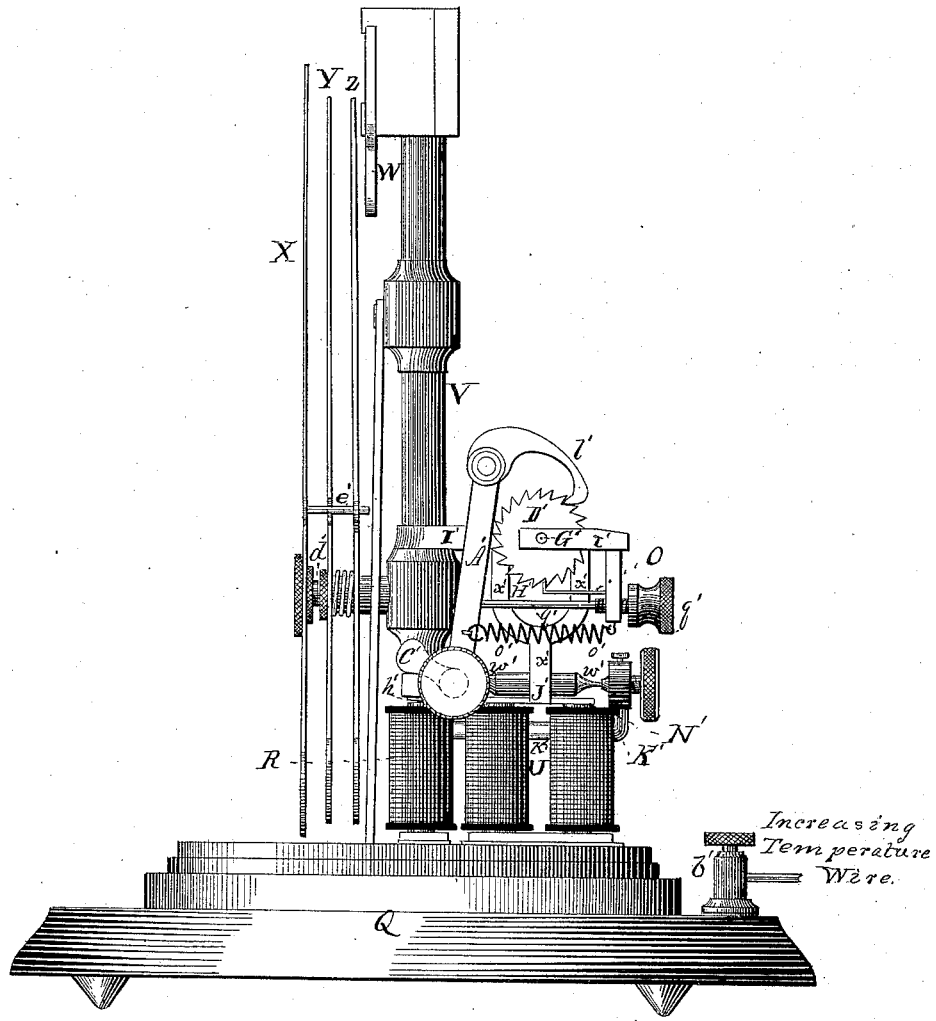

(No Model.)  11 Sheets—Sheet 10.

H. J. HAIGHT.
ELECTRO MAGNETIC THERMOSCOPE.

No. 307,543.  Patented Nov. 4, 1884.

WITNESSES
N. A. Clark
A. S. Brown

INVENTOR
Henry Jansen Haight,
By his attorney,
J. S. Brown.

(No Model.)  11 Sheets—Sheet 11.
H. J. HAIGHT.
ELECTRO MAGNETIC THERMOSCOPE.
No. 307,543.  Patented Nov. 4, 1884.
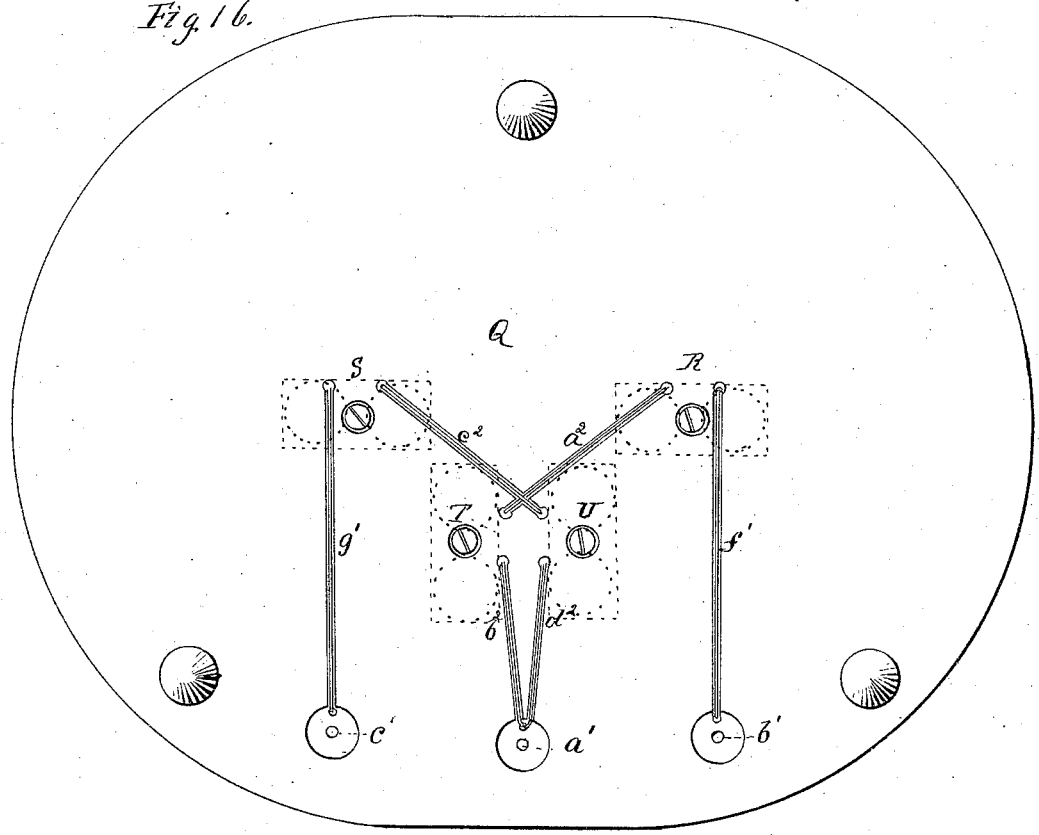
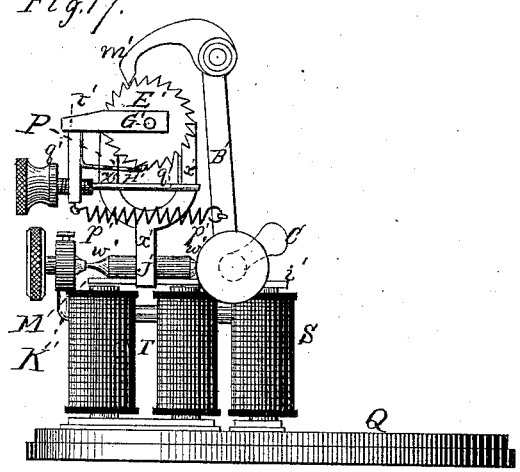
WITNESSES
H. A. Clark.
A. S. Brown
INVENTOR
Henry Jansen Haight,
By his Attorney,
A. S. Brown.

UNITED STATES PATENT OFFICE.

HENRY JANSEN HAIGHT, OF NEW YORK, N. Y.

ELECTRO-MAGNETIC THERMOSCOPE.

SPECIFICATION forming part of Letters Patent No. 307,543, dated November 4, 1884.

Application filed April 21, 1884. (No model.)

*To all whom it may concern:*

Be it known that I, HENRY JANSEN HAIGHT, of New York, in the county of New York and State of New York, have invented a new and Improved Electro-Magnetic Thermoscope; and I do hereby declare that the following is a full and exact description thereof, reference being had to the accompanying drawings, making part of this specification.
The purpose of my invention is to provide an apparatus, or combination of instruments mutually adapted to each other, whereby not only is the temperature of a room or compartment indicated in the room itself, and, if desired, the extremes of high and low temperature in the room within a given interval of time, but more especially the temperature and extremes of high and low temperature in the room or compartment are indicated, by electrical transmission, in any other room or place, at any desired distance from the room or compartment in which the temperature is desired to be known, without going to it.

For these purposes the invention consists of two instruments having the construction, substantially as hereinafter set forth, and operating together through the medium of electric currents generated by a galvanic battery or its equivalent, and transmitted along suitable conducting-wires, the said instruments being each constructed and adapted to perform its proper functions in connection with the other.

The features of improvement in the combination, and in the special adaptation of each instrument to the common purpose, I shall set forth in the following specification and claims.

To clearly indicate the relation of the instruments, the battery, and the connecting-wires, I have shown in Figure 1 a diagram, in which I designate as the "transmitting-thermoscope" the instrument located in the room or compartment wherein the degree of temperature is to be ascertained, and as the "receiving-thermoscope" the instrument situated in the room or place wherein it is desired to read or ascertain the temperature of the room or compartment in which the transmitting-thermoscope is placed. The battery (so designated in the diagram) may be located in any convenient position, either near the transmitting-instrument, or in any convenient position intermediate between the two instruments, or generally most conveniently near the receiving-instrument. Three wires extend from one instrument to the other—namely, a battery-wire, to receive the electrical currents from the battery and conduct them to the instruments, or one of the instruments; an increasing-temperature wire, which completes a circuit with the battery-wire when the heat is increasing in the transmitting-room; and a decreasing-temperature wire, which completes a circuit with the battery-wire when the temperature is decreasing in the transmitting-room. These wires I designate by name in the diagram. All three of the wires, of course, extend from one instrument to the other; but only one wire connects with the battery, the part of which that connects the battery with one instrument being positive as to the electric currents passing over it, and the part that connects the battery with the other instrument being negative as to the currents passing over it. It is immaterial which part is positive and which negative. It is the office of the transmitting-instrument to close the circuit over the increasing-temperature wire once whenever the temperature in the transmitting-room is increased one degree, and then to break the circuit again, and to close the circuit over the decreasing-temperature wire once whenever the temperature in the room is decreased one degree, and then to break it again. It is the office of the receiving-instrument to register or indicate on the temperature-scale thereof one degree higher whenever the transmitting-instrument closes the circuit over the increasing-temperature wire, and to register or indicate on the scale one degree lower whenever the transmitting-instrument closes the circuit over the decreasing-temperature wire. If the transmitting-instrument has a corresponding temperature-scale and registering or indicating device with the operations specified above, it is obvious that the two instruments will at any time indicate the same degree of temperature, and if the transmitting-instrument truly indicates the actual temperature of the room or compartment in which it is placed, the receiving-instrument will indicate also the actual temperature of the same room at whatever distance it may be from the transmitting-room; and this it is the purpose of the invention to perform.

I will now proceed to describe the transmitting-thermoscope organized to indicate the temperature in the room or compartment in which it is situated, and to transmit by electrical currents the indications of temperature therefrom to the receiving-thermoscope. The general construction of this thermoscope is or may be similar to that described in Letters Patent issued to me August 5, 1884, No. 302,908; but I do not, in the present invention, represent hands or indicators for highest and lowest temperature, as in that application, although such may be added, if desired; yet such indicators form no part of the present invention. To that general organization I now add the features which adapt such a thermoscope to the present purpose. It is to be understood, also, that I do not confine the scope of my present invention to that particular construction of a local thermoscope; but it is to apply to any construction thereof capable of embodying therewith the peculiar features of the present invention.

The following figures of the accompanying drawings represent the transmitting-thermoscope thus organized and adapted to the present purpose.

Figure 2:
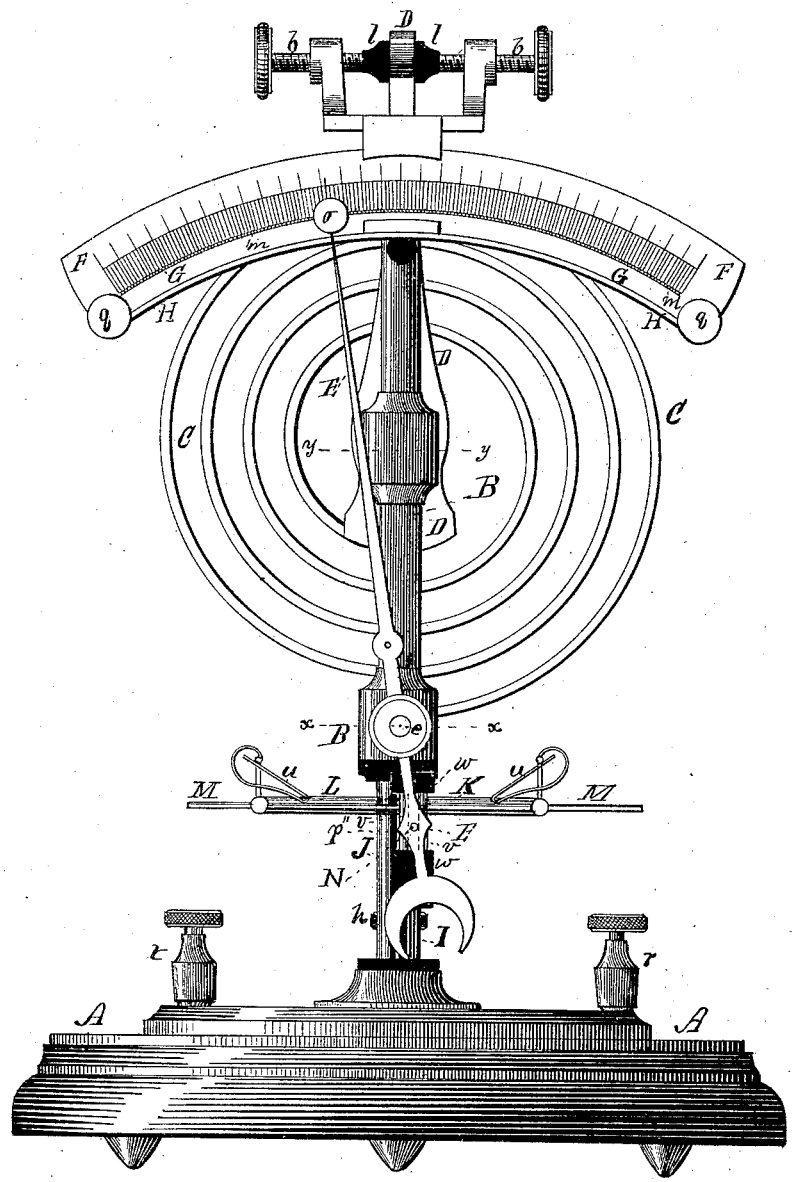
Figure 3:
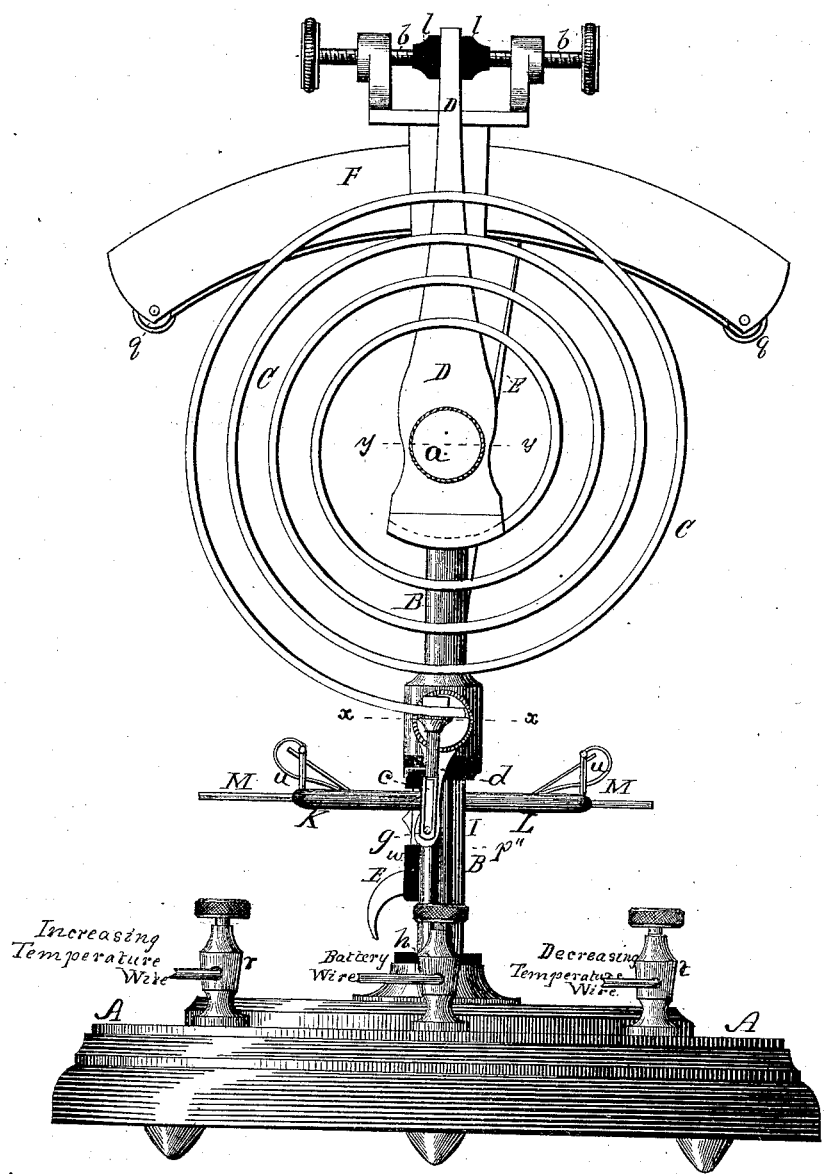

Fig. 2 represents a front view of the transmitting-thermoscope; Fig. 3, a rear view of the same; Fig. 4, a side view thereof; Fig. 5, a top view of the same; Fig. 6, a bottom view of the base of the instrument; Fig. 7, a central vertical section of the base and lower part of the instrument; Fig. 8, a section in a plane indicated by the line $x\ x$, Figs. 2, 3, and 4; Fig. 9, a section in a plane indicated by the line $y\ y$, Figs. 2, 3, and 4. Figs. 10, 10', and 11, views of parts in detail.

The same letters designate the same or corresponding parts in all these figures.

In these drawings, A represents the base of the stand on which the operative parts of the instrument are mounted; B, the standard thereof, supported by the base; C, a thermometric coil by which the temperature of the room or compartment in which the instrument is situated is ascertained and indicated on the instrument; D, an arm supporting the coil, and itself supported by the standard; E, a hand or index moved by the coil under the influence of the varying temperature in the room or compartment, and F a graduated scale upon which the hand or index indicates the temperature. The arm D is mounted on a pin or stud, $a$, projecting from the standard, so as to turn laterally in the arc of a circle, for adjusting the position of the coil to the scale and showing the true temperature thereby. The arm reaches up to the top of the standard, and its upper end is held between two adjusting-screws, $b\ b$, mounted in lateral arms of the standard. An arm, $c$, projects from the outer movable end of the coil C, and is coupled to an arm, $d$, on the shaft $e$ of the index or hand E by a pin, $g_r$, or its equivalent. The shaft $e$ turns in the standard B, and projects from opposite sides thereof.

Thus far described the instrument is simply a thermometer, and the parts named are constructed to operate substantially as the corresponding parts described in the former application above referred to.

For adapting this instrument to the new purpose of my present invention, and thereby making it serve as a transmitting-instrument of thermometric indications by electrical agency to the receiving-instrument, first, I place the scale F in the electric circuit, and, as a matter of convenience, I place the standard B, to which the scale is directly attached, also in the circuit, and connect it at the bottom with the battery-wire by means of a binding-post, $h$, to which the said wire is attached, and a suitable metallic connection, such as a wire, $i$, Fig. 6, between the standard and binding-post. The base A of the stand, being made of wood or other non-conducting material, insulates this electrical way from the others. I also place the hand or index E in the electrical circuit, but insulated from the scale and its metallic connections; and since I have represented the hand or index mounted on the standard B, which is electrically connected with the scale, I insulate the index-shaft $e$ from the standard by mounting it in an electrically non-conducting bearing, $j$, such as gutta-percha. (Shown most clearly in Fig. 8.) Since by the construction represented, also, the coil C and holding-arm D have metallic connection with the index, I insulate these parts also from the standard B by interposing an insulating material, $k$, (shown most clearly in Fig. 9,) between the arm D and its supporting-pin $a$, and insulating-blocks $l\ l$, on the ends of the adjusting-screws $b\ b$, between them and the arm. The mountings and insulations shown are suitable for the instrument as constructed, but may be varied at will.

Now, to fulfill the required function of this transmitting-instrument, I provide for establishing electrical connection between the scale F and index E whenever the latter points exactly to a degree-mark on the scale, and for breaking the circuit again whenever, and keep it broken as long as, the index points to a space between the degree-marks on the scale. To effect this a metallic strip or ridge, G, is formed on or attached to the scale, preferably of arc or curved form, as shown, and near one edge of the scale-graduations; and it is provided with a series of sharp projections or outwardly-projecting teeth, $m\ m$, one exactly oppositely to each degree-mark; and a very thin flexible strip or finger, $n$, (suitably made of platinum, copper tissue, or some elastic metal,) is attached to the index, and adapted to have its inner end just lightly touch the extremities of the teeth on the contact-strip G when the index moves in front of them, but to move out of contact with the strip when the index moves over or in front of spaces between the teeth. This circuit-closing finger is or may be adjustable in relation to the teeth by a set-screw, o; and in order that there may be no essential variation of the index from its normal position and distance from the contact-teeth, it is caused to move between arc-shaped guide-rods H H, situated parallel with the face of the scale and suitably supported by the scale-plate, but insulated therefrom by insulating-blocks p p, and adjusted in position by screw-bolts q q, which secure the rods to the scale-plate. It will thus be seen that when the index is moving over or in front of the scale, whether the temperature is increasing or decreasing, and consequently whether the index is moving in one direction or the opposite, the electrical circuit will be closed every time the index-finger passes a degree-mark, and will be broken again when it passes beyond a degree-mark; hence it is obvious that this alternate closing and breaking of the electric circuit at every movement of the index one degree over the scale produces a corresponding movement on the receiving-instrument. To complete the function of this transmitting-instrument, it is required to close different circuits when the index is moving in opposite directions. I show means for accomplishing this by the construction represented in these drawings. For this purpose I employ a commutating device of peculiar construction, as follows: Two metallic studs or strips, I J, project from the base A on opposite sides of the standard B, and insulated therefrom by insulating plates or strips $p''$ $p''$, or equivalent means. One stud, I, is electrically connected by a wire or metallic connection, $q''$, Fig. 6, with a binding-post, r, to which is attached the increasing-temperature circuit-wire; and the other stud, J, is similarly connected by a wire or metallic connection, s, with a binding-post, t, to which is attached the decreasing-temperature circuit-wire. Arms K L project outward and forward from the studs I J, and carry a commutating-slide, M, which slides freely in or on the two arms. Very light springs $u u$ rest on this slide, so as to offer little resistance to its sliding, but sufficient to hold it accurately in any position in which it is left. The commutating-slide M is composed of two divisions, right and left, each having a vertical branch rod, v, as shown, inserted at the ends in insulating-blocks w w, the lower block also serving as a weight to keep the rods v v in a vertical position. These two rods are parallel, and at a little distance apart—just a very little greater than the diameter of a contact-pin, N, which projects backward from the lower end of the index E between the said rods. Thus, when the contact-pin N touches one rod v, it forms electrical connection with the same, and not with the other rod. Therefore, when the heat in the room is increasing and the index E is moving toward the left, the contact-pin N touches the right-hand rod v, thus closing the circuit from the index to the increasing-temperature wire through the right-hand division of the commutating-slide M, through the arm K, stud I, metallic connection $q''$, and binding-post r whenever a degree is reached by the index E on the scale F; and when the heat is decreasing in the room, and the index is moving toward the right, the contact-pin N touches the left-hand rod v, thus closing the circuit from the index to the decreasing-temperature wire through the left-hand division of the commutating-slide M, through the arm L, stud J, metallic connection s, and binding-post t whenever the index touches a degree-tooth on the scale. The commutating-slide M is moved endwise, in one direction or the other, by the index E as it moves to the left or right, the contact-pin N of the said index acting upon one or the other of the vertical rods v v to produce this movement, which is necessary to accommodate the slide to the varying positions of the index, is made sufficiently long and may have a sufficient sliding movement in the arms K L to allow the index to move over the entire length of the scale, so that the highest or lowest degree of temperature indicated on the scale may be indicated by transmission on the receiving-instrument.

The receiving-thermoscope is represented by the drawings in the following figures.

Figure 15:
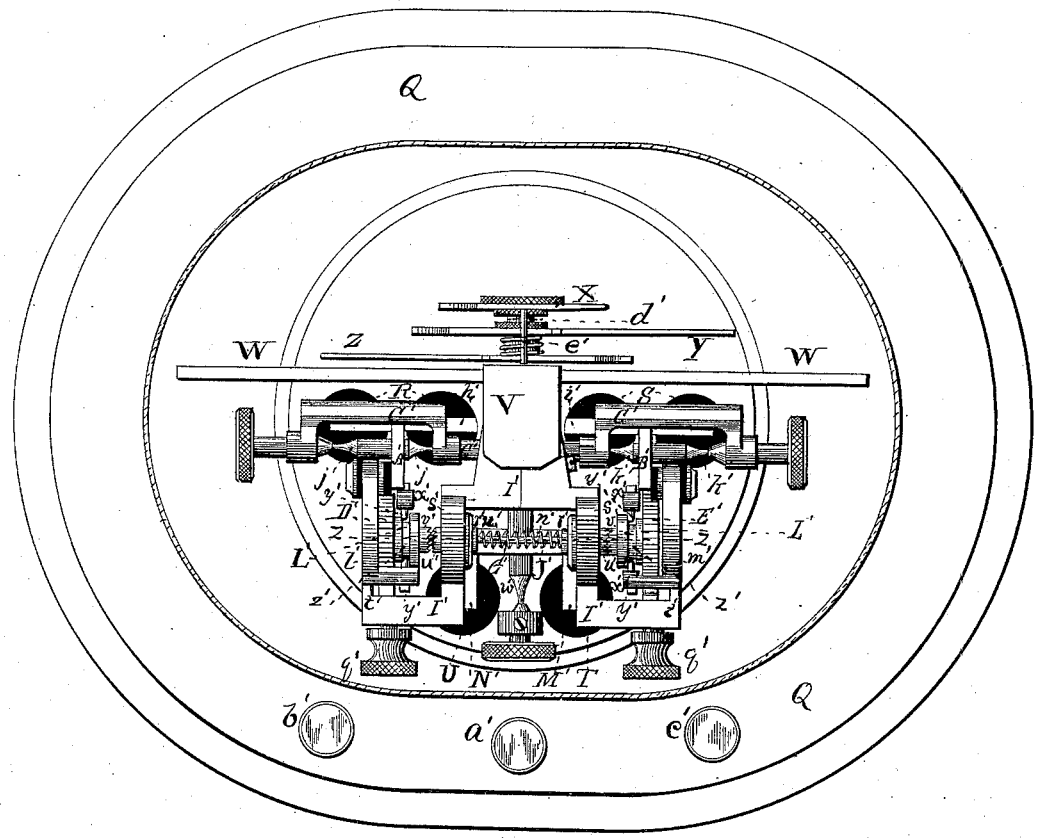
Figure 18:
Figure 19:
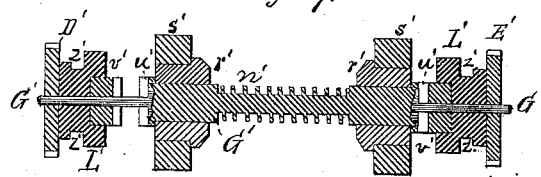

Fig. 12 represents a front view of the receiving-thermoscope, an inclosing glass case being shown in section; Fig. 13, a rear view of the thermoscope; Fig. 14, a side view thereof; Fig. 15, a top view of the same; Fig. 16, a view of the under side of the base of the instrument; Fig. 17, a side view of the main operative parts of the instrument in position; Fig. 18, a view of a part detached; Fig. 19, a section in a plane indicated by the line z z Fig. 15.

Like letters designate corresponding parts in all of the figures.

A suitable base, Q, carries three binding-posts, $a'$, to which the battery-wire is attached, $b'$ to which the increasing-temperature wire is attached, and $c'$ to which the decreasing-temperature wire is attached. It is thus clearly seen how this instrument is electrically connected with the transmitting-instrument. The base Q supports four electro-magnets, R S T U, employed in the instrument, and a standard, V, which sustains the other operative parts of the instrument, and a scale, W, corresponding exactly in its divisions and numbering in relation to the movements of its index with the scale F of the transmitting-instrument. An index, X, indicates the current temperature on the scale and corresponds exactly with the index E in the transmitting-instrument. There is also a highest-temperature index or hand, Y, and a lowest-temperature index or hand, Z. The main index X is mounted on a shaft, $d'$, having its bearing in the standard V, and the two indexes Y and Z are or may be mounted around the said shaft in such a manner as to be separately and readily movable outward in the arc of a circle around the shaft $d'$ as a center, by means of a coupling-pin, $e'$, projecting backward from the main index X, and so as to be held in any position in which each may be left by the main index, all substantially as set forth in the said previous Letters Patent. Now, the function of this instrument is to move the shaft $d'$ on which the indexes are mounted by electro-magnetic means, so that the movements or the main index X will exactly correspond with the movements of the index E in the transmitting-instrument. The movements of the main index being thus accomplished, the resultant movements of the indexes Y Z follow in the same way as described in the said former application, and no further description thereof will be necessary in this specification. Any suitable arrangement of the same, however, may be employed.

To fulfill the function of this instrument, as above stated, the index-shaft $d'$ is required to be turned to the left, (in the construction represented in the drawings,) or so as to move the index to the left over the scale when the temperature in the room containing the transmitting-instrument is increasing, and to be turned to the right when the temperature in the room is decreasing. The movement to the left is effected by means of an electro-magnet R, the coils of which are connected with the increasing-temperature wire by a wire or metallic connection, $f'$, extending from the binding-post $b'$ to the said electro-magnet. As shown in Fig. 16, this wire or metallic connection is located in the base Q of the instrument, which, being suitably made of wood, insulates each binding-post or metallic way from the others without further provision. The movement of the shaft $d'$ and main index to the right is effected by means of an electro-magnet, S, the coils of which are connected with the decreasing-temperature wire by a wire or metallic connection, $g'$, extending from the binding-post $c'$ to the said electro-magnet. The mechanical connections between these actuating electro-magnets and the index-shaft $d'$ is substantially the following: The respective armatures, $h'$ $i'$ of the two electro-magnets, R S, are mounted on bell-crank levers A' B', respectively, whose pivots $j'$ $k'$ have bearings in a yoke-frame, C', secured to the standard V, and pawls $l'$ $m'$, respectively pivoted to the said levers, act upon ratchet-wheels D' E' coupled to a horizontal worm-shaft, G.' The worm or endless screw $n'$ of the worm-shaft gears into a worm-wheel, H', on the said index-shaft $d'$. With this construction every time that the circuit over the increasing-temperature wire is closed by the transmitting-instrument, the electric current passing through the coil or coils of the electro-magnet R, attracts the armature $h'$ thereof, causing a forward vibration of the lever A', whose pawl $l'$ is thereby caused to draw on and move the ratchet-wheel D' the distance of one notch or tooth on its periphery. The ratchet-wheel, worm-shaft, and worm-wheel are so constructed and conformed to one another in relation to the index X that the moving of the ratchet-wheel one notch moves the index one degree over the scale W toward the left or upward on the scale. Similarly, every time that the circuit over the decreasing-temperature wire is closed by the transmitting-instrument, the electric current passing through the coil or coils of the electro-magnet S, attracts the armature $i'$ thereof, causing a forward vibration of the lever B', whose pawl $m'$ is thereby caused to move over the ratchet-wheel E', the distance of one notch or tooth thereof, or a little more, the same proportioning of this ratchet-wheel and the worm-shaft and worm-wheel, in relation to the index X, existing as with the other ratchet-wheel, so as to produce a corresponding movement of the index on the scale at every movement of the ratchet-wheel one notch; but there is a difference in the actions of the two lever-pawls on the ratchet-wheels in the construction represented, which is to be here noted. The two levers, A' B', acting alike, would, if the action of their two pawls on the ratchet-wheels were alike, both cause the worm-shaft and consequently the index-shaft and index to move always in one direction, whereas it is required that the two electro-magnets should cause the worm-shaft, index-shaft, and index to move in opposite directions. I effect this result by the following variation of the pawl mechanisms: Thus, while the pawl $l'$ of the lever A', actuated by the electro-magnet R, acts directly upon the ratchet-wheel D', and moves the same when the electric circuit is closed and the lever is retracted by a spring, $o'$, when the circuit is again broken, as shown in Fig. 14. On the other hand the pawl $m'$ on the lever B', actuated by the electro-magnet S, is simply retracted in relation to the ratchet-wheel E' when the electric circuit is closed, and a counter-spring, $p'$, causes the said pawl to move the said ratchet-wheel, when the circuit is again broken, as shown in Fig. 17, the teeth of the ratchet-wheel pointing in the opposite direction to those of the ratchet-wheel D'. Suitable adjustable stops, $q'$ $q'$, limit the backward movements of the two pawl-levers, and detents O P prevent any return or back movement of the ratchet-wheels. Since it is necessary that the worm-shaft be turned in opposite directions by the action of the two electro-magnets, as above set forth, when either pawl is acting, it is necessary either to withdraw the other pawl from engagement with its ratchet-wheel, or one ratchet-wheel must be uncoupled from the worm-shaft while the other ratchet-wheel is being acted upon by its pawl. I show the latter construction and means for automatically clutching and unclutching the the ratchet-wheels alternately on the worm-shaft through the agency of the electric current passing, respectively, over the increasing-temperature wire and the decreasing-temperature wire. The worm-shaft G' is held and prevented from slipping endwise by enlargements or flanges r' r' thereon, formed with or secured to the shaft and fitting closely between two bearings, s' s', of the frame I', which projects from the standard V for carrying the ratchet-wheel and worm-shaft devices. The said worm-shaft is extended beyond the bearings s' s' in both directions, and to other bearings, t' t', at some distance outside of first bearings. Between the two bearings s' t' at both ends of the worm-shaft the two ratchet-wheels D' E' are mounted loosely on the said shaft-extensions, so as not only to turn on the shaft, but to have a slight lateral movement lengthwise of the shaft. The worm-shaft has sets of clutch-teeth u' u' just outside of the bearings s' s', and the ratchet-wheels have, respectively, sets of clutch-teeth v' v' on their inner sides to engage with the clutch-teeth of the worm-shaft, and these ratchet-wheels are located on the worm-shaft, so as to have a sliding movement thereon just sufficient to engage and disengage the adjacent clutch-teeth u' v' alternately, for coupling one or the other ratchet-wheel to the worm-shaft, as required. To complete the organization of the device for accomplishing the purpose required, there must be such a connection between the two ratchet-wheels that as one ratchet-wheel is engaged by its clutch to couple it to the worm-shaft the other ratchet-wheel, previously engaged, will become disengaged by its clutch to uncouple it from the worm-shaft. I effect this in connection with two additional electro-magnets, T U, for automatically producing the reversing-movements required, by mounting an armature-lever, J', on pivots w' w' in bearings on an arm, K', projecting from the standard V between the said electro-magnets. The lever has two arms, x' x', projecting upward, respectively, from its two ends. These arms are forked to embrace projecting hubs or sleeves L' L' on the sides of the ratchet-wheels D' E', respectively, and each fork of each arm has an inwardly-projecting pin or finger, y' y', to fit in grooves z' z', Fig. 19, respectively, in the peripheries of the said hubs or sleeves, so that while the ratchet-wheels turn without impediment between these forks, they are moved lengthwise on the worm-shaft by the said forks, when the armature-lever J' is vibrated vertically and its vertical arms are thereby vibrated horizontally. Thus the ratchet-wheels are moved alternately to clutch one or the other to the worm-shaft, and at the same time to uncouple the other from the worm-shaft by this vibration up and down of the armature-lever. This vibration of the armature-lever is effected electrically by two armatures, M' N', attached to opposite ends of the lever J', respectively, over the two electro-magnets T U, and being alternately attracted by the said magnets when they are magnetized by electric currents. With this construction, when the increasing-temperature-wire circuit is closed, and the electro-magnet R is magnetized thereby, of course the ratchet-wheel D' is to be coupled to the worm-shaft, so that the lever A' and its pawl l' may act through it on the said worm-shaft. Therefore, to couple this ratchet-wheel to the worm-shaft, the end of the armature-lever bearing the armature M' must be lowered by magnetizing the electro-magnet T beneath it. I effect this by introducing its coils into the electric circuit of the increasing-temperature wire the same as that of the electro-magnet R. This I accomplish by a wire or metallic connection, $a^2$, Fig. 16, extending from the coils of the electro-magnet R to the coils of the electro-magnet T, and another wire or metallic connection, $b^2$, extending from the latter coils to the binding-post a', to which the battery or return-wire is attached. Therefore, whenever increasing temperature in the transmitting-instrument room closes the said circuit the magnetization of the electro-magnet T causes it to draw down the armature M' and that end of the armature-lever, and consequently couples the ratchet-wheel D' to the worm-shaft. By an exactly similar construction, where the decreasing-temperature circuit is closed, it is required to couple the ratchet-wheel E' to the worm-shaft and uncouple the ratchet-wheel D' therefrom, which is to be effected by drawing down the armature N' by magnetizing the electro-magnet U and introducing its coils into the electric circuit of the decreasing-temperature wire the same as the electro-magnets S—namely, by means of a wire or metallic connection, $c^2$, Fig. 16, extending from the coils of the electro-magnet S to the coils of the electro-magnet U, and another wire or metallic connection, $d^2$, extending from the latter coils to the said binding-post a' of the battery, or return-wire. Hence, whenever decreasing temperature in the transmitting-instrument room closes the said circuit, the magnetization of the electro-magnet U draws down the armature N' and that end of the armature-lever J', and consequently couples the ratchet-wheel E' to the worm-shaft. Thus the full purpose of the instrument is accomplished. This thermoscope is capable of very general application, and of serving many useful purposes. Wherever it is desirable to know or ascertain at any considerable distance the temperature of a room or locality it may be applied with great advantage. For example, by placing a transmitting-thermoscope in a green-house, and a receiving-thermoscope in a gardener's lodge or house, with suitable circuit-wires connecting them, the gardener can ascertain at any time, night or day, the condition of the heat in the green-house, without the necessity of visiting it, until the lowering of the temperature warns him of the necessity of increasing the fire. It is also desirable in hospitals, institutions of learning, factories, office-buildings, and other large institutions and buildings, where an engineer or head officer in charge may have receiving-thermoscopes in his room or office connecting electrically with the various rooms of the building containing transmitting-thermoscopes, and thus he has the thermometric condition of each room immediately under his observation, to be regulated as required.

I claim as my invention—

1. A transmitting-thermoscope having a thermometric index, a circuit-closing arch or plate having teeth corresponding with the degrees of temperature, and a flexible contact-strip borne by the said index, and adapted to close the circuit by coming in contact successively with the teeth of the said arch, in combination with a receiving-thermoscope and battery and circuit-closing wires connecting the two thermoscopes.

2. A transmitting-thermoscope provided with a thermometric index, a thermostatic coil actuating the said index, a circuit-closer corresponding with the degrees of temperature, separately-insulated temperature-increasing and temperature-decreasing electric circuits, and a commutating device, substantially as specified, in combination with a receiving-thermoscope, and battery or return and increasing and decreasing temperature wires, for the purpose set forth.

3. In combination with the transmitting-thermoscope and connecting-wires, a receiving-thermoscope having its index actuated in opposite directions by electro-magnets magnetized alternately by currents passing, respectively, through the temperature-increasing and temperature-decreasing wires, and provided with two additional electro-magnets alternately magnetized by the said currents, and means for engaging and disengaging the connection between the armatures of the actuating electro-magnets and the index-shaft by the armatures of the said additional electro-magnets.

4. In a transmitting-thermoscope, the combination of a thermostatic hand or index, E, circuit closing and breaking strip G, and guides H H for keeping the hand or index in proper position in relation to the said strip.

5. In a transmitting-thermoscope, a commutating-slide, M, provided with circuit-closing contact-rods $v\ v$, respectively in electric connection with temperature-increasing and temperature-decreasing transmitting-wires, and a temperature-determining hand or index, E, actuated by a thermostatic coil and provided with a contact-pin, N, located between the said circuit-closing rods, substantially as and for the purpose herein specified.

6. In a receiving-thermoscope, the combination of a thermoscopic scale, a thermoscopic hand or index, a worm-wheel on the shaft of the said index, a worm-screw geared to the worm-wheel, a temperature-increasing electro-magnet, a temperature-decreasing electro-magnet, and means for transmitting motion from the said electro-magnets, respectively, to the shaft of the said worm-screw.

7. In a receiving-thermoscope, the combination of a thermoscopic scale, a thermoscopic index, a worm-wheel on the shaft of the said index, a worm-screw geared to the worm-wheel, a temperature-increasing electro-magnet, a temperature-decreasing electro-magnet, means for transmitting motion from said electro-magnets, respectively, to the worm-screw shaft, means for coupling the said worm-screw shaft, and the mechanisms connecting the said electro-magnets to the said worm-screw shaft, respectively, and uncoupling it therefrom, and means for coupling and uncoupling the said connecting mechanisms to and from the worm-screw shaft alternately by the temperature-increasing and temperature-decreasing currents.

8. In a receiving-thermoscope, the combination of a thermoscopic scale, a thermoscopic index, a worm-wheel on the shaft of the said index, a worm-screw geared to the said worm-wheel, a temperature-increasing electro-magnet, a temperature-decreasing electro-magnet, means for transmitting motion from the said electro-magnets, respectively, to the worm-screw shaft, means for coupling and uncoupling the said transmitting mechanisms to and from the worm-screw shaft, respectively, and two electro-magnets for alternately actuating the said coupling and uncoupling mechanisms by the temperature-increase and temperature-decrease currents.

9. The combination of the index E, provided with a flexible strip, $n$, and the strip or ridge G, provided with the circuit-closing teeth or projections $m\ m$, substantially as and for the purpose herein specified.

10. The combination of the index E, provided with the flexible strip $n$, the strip or ridge G, provided with the teeth or projections $m\ m$, and the guide-rods H H, substantially as and for the purpose herein specified.

11. The combination of the supporting-standard B of the transmitting-thermoscope in one part of an electric circuit, the index E in another part of the same electric circuit and insulated from the standard B, a toothed circuit-closing strip or ridge, G, in electric connection with the said standard, and a flexible circuit-closing strip, $n$, in electric connection with the index, substantially as and for the purpose herein specified.

12. The combination of the arms K L, respectively, in electric connection with the temperature-increasing and temperature-decreasing wires, and insulated from each other and from the standard or battery wire connection, and the commutating-slide M, having two divisions, insulated from each other and mounted, respectively, on the said arms, substantially as and for the purpose herein specified.

13. The combination of the arms K L, commutating-slide M, light springs $u\ u$, and contact-pin N, whereby the slide is always retained in every position left by the said contact-pin, substantially as and for the purpose herein specified.

14. The combination of the arms K L in different electric circuits, the commutating-slide M, formed in two divisions, insulated from each other, and having, respectively, parallel branch rods $v\ v$, and the contact-pin N on the index E, substantially as and for the purpose herein specified.

15. The combination of the electro-magnets R S, armature-levers A' B', pawls $l'\ m'$, reversely-acting ratchet-wheels D' E', worm-screw shaft G', clutch-teeth $u'\ v'$, electro-magnets T U, and armature-lever J', coupled to the said ratchet-wheels, substantially as and for the purpose herein specified.

16. The combination of the armature-levers A' B', pawls $l'\ m'$, ratchet-wheels D' E', worm-screw shaft G', and adjustable stops $q'\ q'$, substantially as and for the purpose herein specified.

17. The combination of the armature-levers A' B', pawls $l'\ m'$, ratchet-wheels D' E', detents O P, and stops $q'\ q'$, substantially as and for the purpose herein specified.

18. The combination of the ratchet-wheels D' E', provided with grooved sleeves L' L', worm-screw shaft G', and armature-lever J', provided with forked arms $x'\ x'$, and coupling-pins $y'\ y'$, substantially as and for the purpose herein specified.

19. In a receiving-thermoscope, the combination of a scale, W, main index X, actuated by electric currents from a transmitting-thermoscope, a highest-temperature index, Y, and lowest-temperature index Z, for the purpose herein specified.

Specification signed by me this 12th day of March, 1884.

HENRY JANSEN HAIGHT.

Witnesses:
HENRY PEAKE,
EDWARD C. HAIGHT.